Patented May 23, 1933

1,910,521

UNITED STATES PATENT OFFICE

CLARENCE E. COLEMAN, OF BUFFALO, NEW YORK, ASSIGNOR TO DU PONT CELLOPHANE COMPANY, INC., OF NEW YORK, N. Y., A CORPORATION OF DELAWARE

METHOD AND APPARATUS FOR PRODUCING A SHEET OF FILM OF REGENERATED CELLULOSE

Application filed January 15, 1930. Serial No. 421,050.

This invention relates to an apparatus and method of producing sheets or films of regenerated cellulose. More particularly, it relates to a method and apparatus of producing sheets or films of regenerated cellulose having substantially smooth surfaces devoid of streaks, striations and other surface irregularities.

Sheets or films of regenerated cellulose are produced from cellulose solutions by methods known as casting. One of these methods, known as wheel casting, consists of pouring the cellulose solution out of a hopper on to the peripheral surface of a rotating wheel partially submerged in a solution capable of coagulating and/or regenerating the cellulose. In this method the thickness of the film is, to a great extent, determined by a doctor knife, mounted in an adjustably fixed relation to the surface of the wheel, which controls the thickness of the cellulose solution laid on the peripheral surface of said wheel.

The second and preferred method is the casting from a hopper directly into a bath without any support from the film. After the film has been sufficiently coagulated and/or regenerated, it is led out of the bath and subjected to the other subsequent treatments. In this method the film is usually led through the bath by means of a driven roller positioned sufficiently far from the hopper lips to permit the film to attain a durable structure before coming into contact with the roll. The thickness of the film is determined by the spaced relation of the lips of the hopper.

In practice, it has been extremely difficult to produce a film which is entirely smooth and free from streaks, striations and other surface irregularities. These defects are due partly to the solid impurities contained in the cellulose solution which have escaped the filter or formed therein after passing the filter. The imperfections may also be due to particles found in the bath and which become attached to the hopper lips or to the film itself. In hopper casting every effort is made to maintain the two lips properly machined and in true proper relation to each other as well as to keep the lips and/or opening therebetween free from foreign particles. This is, however, never actually attained. The result is that the transparent film produced generally contains imperfections which require that it be classified as a poor film and either sold at a lower price or entirely discarded.

I have found that by subjecting the film after coagulation and regeneration and before it is completely regenerated and while it is in the plastic state to a smoothing, ironing or calendering operation, substantially smooth surfaces devoid of streaks, striations and other surface irregularities can be obtained.

It is therefore an object of this invention to provide a method of casting sheets or films of regenerated cellulose having substantially smooth surfaces and being substantially free from streaks, striations and/or other surface irregularities.

Another object of this invention is to provide a method of casting sheets or films of regenerated cellulose, wherein the regenerated cellulose sheets or films are subjected to a smoothing operation, such as calendering or ironing, while they are in a plastic state.

A further object of this invention is to provide a method of casting sheets or films of regenerated cellulose wherein the regenerated cellulose sheets or films are subjected to a smoothing operation, such as calendering or ironing, while the sheets are in a plastic state and before they are completely regenerated.

An additional object of this invention is to provide an apparatus for carrying out the above method.

Other objects will appear from the following description, appended claims and accompanying drawing in which:

Figure 1:
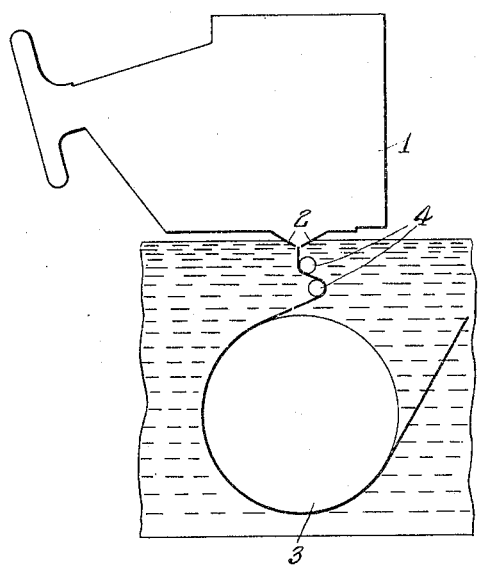
Figure 1 illustrates a hopper casting apparatus in combination with a smoothing device, the hopper being shown diagrammatically.

Referring to the drawing wherein like reference numerals designate like parts, the reference numeral 1 designates a hopper containing a cellulose solution, such as viscose, cuprammonium cellulose and similar materials, and provided with lips 2 in the bottom thereof, between which the cellulose solution passes as it leaves the hopper. Inasmuch as the specific details of the hopper form no essential part of this invention, further description thereof is deemed unnecessary here. The lips 2 of the hopper determine the thickness of the film and are generally maintained beneath the surface of a bath containing a coagulating and regenerating medium. Upon the introduction of the film of cellulose solution in the bath, coagulation and regeneration thereof begins and, after the film has attained sufficient strength, it is conducted on to the positively driven roll 3 submerged in the bath liquor. After leaving the roll 3 the film is led through the bath liquor until it is substantially completely regenerated, at which time it is subjected to the various other subsequent treatments.

The cellulose film, just after its introduction in the bath, is capable of being worked and manipulated similar to a plastic mass. Thus, if at this stage of the operation the plastic and partially regenerated film is subjected to a smoothing operation, a film having substantially smooth surfaces devoid of streaks, striations and other surface irregularities will be obtained.

The smoothing operation may be effected by mechanically working the film as by ironing, calendering, working back and forth and the like. For example, if between the hopper lips 2 and the roll 3 a rod, roll or other means (hereafter called rod) is provided and the film made to travel over this rod, the friction produced thereby will effect the desired results. A plurality of rods 4 may be used instead of a single rod, and, if said rods are arranged in such relation to each other that the path of the film is staggered, somewhat better results are obtained. In this arrangement the film is alternately treated on one side and then on the other. It is, of course, obvious that any number of rods may be used and the invention is not limited to the exact number shown in Figure 1.

For the purpose above set forth any rod which is of well-defined smoothness, accurate straightness and even diameter is satisfactory. It must, however, be of such composition as will endure the action of the bath. In practice, I have found that rods made of glass, bakelite, hard rubber or smoothly surfaced metal are satisfactory.

Figure 2:
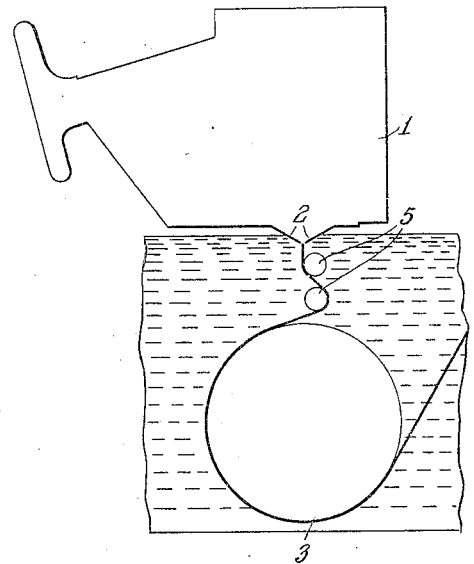
Figure 2 illustrates another modification of the smoothing device in combination with the hopper casting apparatus, the hopper being shown diagrammatically.

Instead of using the stationary rod or rods, satisfactory results may be secured by employing a rod or plurality thereof which is capable of rotation by the movement of the film. Such an arrangement is illustrated in Figure 2, the rods 5 being so arranged that the film passes in a staggered path. It is obvious that instead of depending on the film to rotate the rods, the rods may be positively driven at a rate of speed different from the speed of travel of the film in any suitable manner.

Figure 3:
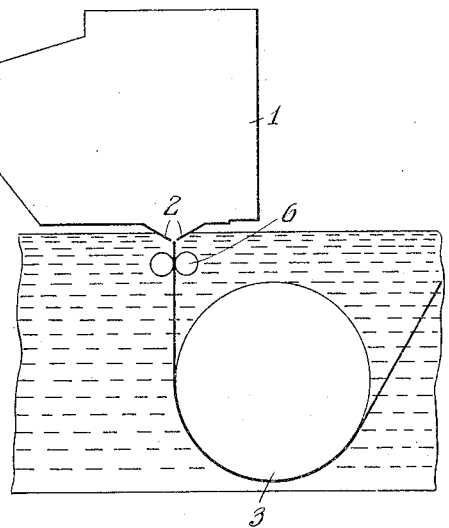
Figure 3 illustrates still another modification of the smoothing device in combination with the hopper casting apparatus, the hopper being shown diagrammatically.

It is not essential that the rods be arranged in fixed spaced relation to each other to provide a staggered path for the film. In fact, the rods may be so positioned relatively to each other that they act as calenders and simultaneously engage the two surfaces of the film at opposite points thereof. Referring to Figure 3 where such an arrangement of parts is illustrated, it will be observed that the longitudinal axes of the rods 6 are disposed in the same horizontal plane and the rods constitute a calender. It is to be understood that the precise arrangement of the calender just described is not essential for the successful practice of the invention. The rods, instead of being disposed as previously described, may be superposed on one another. It is apparent that any number of calenders may be employed and the invention is not restricted to that specifically described and illustrated. The rods 6 may be driven by the movement of the film passing therebetween or, if desired, they may be positively driven. The rods 6 may be resiliently mounted, whereby any predetermined amount of pressure may be obtained.

The process and apparatus hereinbefore described produce sheets or films of regenerated cellulose substantially free from surface imperfections, such as streaks, striations or other irregularities. In addition to the advantages above mentioned, the apparatus and process tend to improve the uniformity of the transverse strength of the film by aiding and permitting the shrinkage of the cellulose, in the course of the formation of the film or in a subsequent treatment, to be more uniformly distributed between the longitudinal direction and transverse direction as well as more uniformly distributed in the transverse direction.

Since it is obvious that various changes and modifications may be made in the specific details above set forth, this invention is not restricted thereto except as defined in the appended claims.

I claim:

1. In a method of producing a sheet or film of regenerated cellulose, the step of smoothing the sheet or film while it is in a plastic and partially regenerated state.

2. In a method of producing a sheet or film of regenerated cellulose, the step of ironing or calendering the sheet or film while it is in a plastic and partially regenerated state.

3. An apparatus for producing a sheet or film of regenerated cellulose comprising a hopper containing a cellulosic solution, a bath into which a film of the solution is introduced and wherein it is coagulated and regenerated, and means to iron or calender the sheet or film while it is in a plastic and partially regenerated state and means to convey the sheet or film through the bath whereby it is completely regenerated.

4. An apparatus for producing a sheet or film of regenerated cellulose comprising a hopper containing a cellulosic solution, a bath into which a film of the solution is introduced and wherein it is coagulated and regenerated, and a rod to iron or calender the sheet or film while it is in a plastic and partially regenerated state, and means to convey the sheet or film through the bath whereby it is completely regenerated.

5. An apparatus for producing a sheet or film of regenerated cellulose comprising a hopper containing a cellulosic solution, a bath into which a film of the solution is introduced and wherein it is coagulated and regenerated, and a plurality of rods to iron or calender the sheet or film while it is in a plastic and partially regenerated state, and means to convey the sheet or film through the bath whereby it is completely regenerated.

6. An apparatus for producing a sheet or film of regenerated cellulose comprising a hopper containing a cellulosic solution, a bath into which a film of the solution is introduced and wherein it is coagulated and regenerated, and a rotatably mounted rod to iron or calender the sheet or film while it is in a plastic and partially regenerated state, and means to convey the sheet or film through the bath whereby it is completely regenerated.

7. An apparatus for producing a sheet or film of regenerated cellulose comprising a hopper containing a cellulosic solution, a bath into which a film of the solution is introduced and wherein it is coagulated and regenerated, and a plurality of rotatably mounted rods to iron or calender the sheet or film while it is in a plastic and partially regenerated state, and means to convey the sheet or film through the bath whereby it is completely regenerated.

8. An apparatus for producing a sheet or film of regenerated cellulose comprising a hopper containing a cellulosic solution, a bath into which a film of the solution is introduced and wherein it is coagulated and regenerated, and a plurality of rods providing a staggered path to iron or calender the sheet or film while it is in a plastic and partially regenerated state, and means to convey the sheet or film through the bath whereby it is completely regenerated.

9. An apparatus for producing a sheet or film of regenerated cellulose comprising a hopper containing a cellulosic solution, a bath into which a film of the solution is introduced and wherein it is coagulated and regenerated, and a plurality of rotatably mounted rods providing a staggered path to iron or calender the sheet or film while it is in a plastic and partially regenerated state, and means to convey the sheet or film through the bath whereby it is completely regenerated.

10. A method of producing a sheet or film of regenerated cellulose which comprises extruding a cellulosic solution in a regenerating bath and smoothing the said sheet or film of partially regenerated cellulose while it is in a plastic state.

11. A method of producing a sheet or film of regenerated cellulose which comprises extruding a cellulosic solution in a regenerating bath and ironing or calendering the sheet or film of partially regenerated cellulose while it is in a plastic state.

12. A method of producing a sheet or film of regenerated cellulose which comprises extruding a cellulosic film in a regenerating bath, smoothing the sheet or film of partially regenerated cellulose while it is in a plastic state and then completely regenerating the sheet or film.

13. A method of producing a sheet or film of regenerated cellulose which comprises extruding a cellulosic solution in a regenerating bath, ironing or calendering the sheet or film of partially regenerated cellulose while it is in a plastic state and then completely regenerating the sheet or film.

14. An apparatus for producing a sheet or film of regenerated cellulose comprising a hopper containing a cellulosic solution, a bath into which a film of the solution is introduced and wherein it is coagulated and regenerated, and means positioned within the bath in advance of the hopper to iron or calender the sheet or film while it is in a plastic and partially regenerated state, and means to convey the sheet or film through the bath whereby it is completely regeneraed.

15. An apparatus for producing a sheet or film of regenerated cellulose comprising a hopper containing a cellulosic solution, a bath into which a film of the solution is introduced and wherein it is coagulated and regenerated, a rod positioned within the bath in advance of the hopper to iron or calender the sheet or film while it is in a plastic and partially regenerated state, and means to convey the sheet or film through the bath whereby it is completely regenerated.

16. An apparatus for producing a sheet or film of regenerated cellulose comprising a hopper containing a cellulosic solution, a bath into which a film of the solution is introduced and wherein it is coagulated and regenerated, a plurality of rods positioned within the bath in advance of the hopper to iron or calender the sheet or film while it is in a flexible and partially regenerated state, and means to convey the sheet or film through the bath whereby it is completely regenerated.

17. An apparatus for producing a sheet or film of regenerated cellulose comprising a hopper containing a cellulosic solution, a bath into which a film of the solution is introduced and whereby it is coagulated and regenerated, a rotatably mounted rod positioned within the bath in advance of the hopper to iron or calender the sheet or film while it is in a plastic and partially regenerated state, and means to convey the sheet or film through the bath whereby it is completely regenerated.

18. An apparatus for producing a sheet or film of regenerated cellulose comprising a hopper containing a cellulosic solution, a bath into which the film of the solution is introduced and wherein it is coagulated and regenerated, a plurality of rotatably mounted rods positioned within the bath in advance of the hopper to iron or calender the sheet or film while it is in a plastic and partially regenerated state, and means to convey the sheet or film through the bath whereby it is completely regenerated.

19. An apparatus for producing a sheet or film of regenerated cellulose comprising a hopper containing a cellulosic solution, a bath into which the film of the solution is introduced and wherein it is coagulated and regenerated, a plurality of rods providing a staggered path positioned within the bath in advance of the hopper to iron or calender the sheet or film while it is in a plastic and partially regenerated state, and means to convey the sheet or film to the bath whereby it is completely regenerated.

20. An apparatus for producing a sheet or film of regenerated cellulose comprising a hopper containing a cellulosic solution, a bath into which the film of the solution is introduced and wherein it is coagulated and regenerated, a plurality of rotatably mounted rods providing a staggered path positioned within the bath in advance of the hopper to iron or calender the sheet or film while it is in a plastic and partially regenerated state, and means to convey the sheet or film through the bath while it is completely regenerated.

In testimony whereof, I have affixed my signature to this specification.

CLARENCE E. COLEMAN.